United States Patent [19]

Onnenberg et al.

[11] Patent Number: 4,759,700
[45] Date of Patent: Jul. 26, 1988

[54] APPARATUS FOR THE PRODUCTION OF CUSHIONS WITH BACK-FOAMED COVERS

[75] Inventors: Volker Onnenberg, Wiehl; Günter Möllmann, Hagen, both of Fed. Rep. of Germany

[73] Assignees: Fritsche-Mollmann GmbH & Co., Lotte; Bayer Aktiengesellschaft, Leverkusen, both of Fed. Rep. of Germany

[21] Appl. No.: 100,502

[22] Filed: Sep. 24, 1987

[30] Foreign Application Priority Data

Oct. 4, 1986 [DE] Fed. Rep. of Germany ....... 3633921

[51] Int. Cl.$^4$ .................................................. B28B 1/50
[52] U.S. Cl. ..................................... 425/4 R; 425/112; 425/117; 425/126.1; 425/127
[58] Field of Search ............... 425/4 R, 112, 116, 117, 425/129, 126 R, 127 R, 200, 817 R

[56] References Cited

U.S. PATENT DOCUMENTS

| | | | |
|---|---|---|---|
| 3,484,510 | 12/1969 | Carazza | 425/4 R X |
| 3,712,771 | 1/1973 | White et al. | 425/126 R |
| 4,338,070 | 7/1982 | Nava | 425/129 R X |
| 4,360,329 | 11/1982 | Hatakeyama | 425/126 R X |

FOREIGN PATENT DOCUMENTS 2746686 4/1979 Fed. Rep. of Germany .

Primary Examiner—Charles Hart
Attorney, Agent, or Firm—Gene Harsh; Joseph C. Gil

[57] ABSTRACT

The present invention is directed to an apparatus for the production of back-foamed cushions from cover materials and foam comprising:

(i) a mold comprising an upper mold half and a lower mold half, said lower mold half defining a cavity, the inside surface of which is capable of being covered by said cover material, (ii) a mix head associated with said mold, said mix head capable of introducing foam materials and/or reactants into said mold cavity, and (iii) at least one pressing element for pressing said cover material into said mold cavity, said pressing element having a pressing edge which consists of at least one balanced spring.

7 Claims, 2 Drawing Sheets

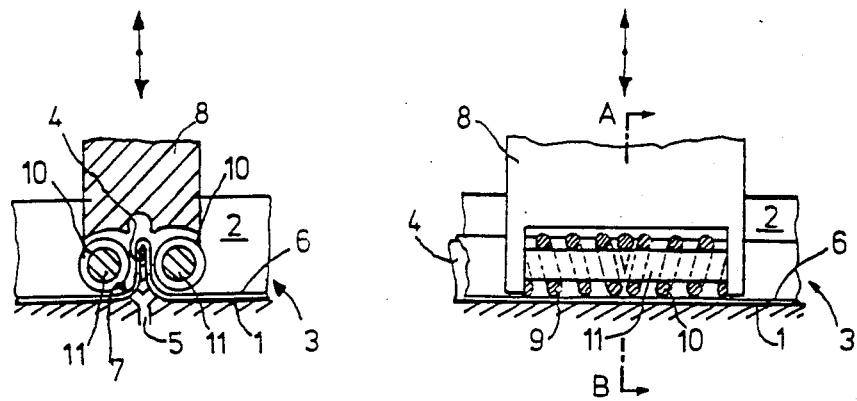
FIG. 1
(A-B)
FIG. 2
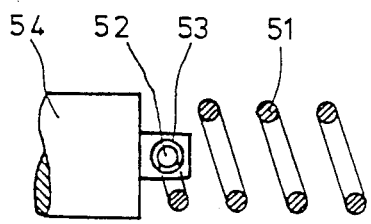
FIG. 5

(E-F)

(C-D)

APPARATUS FOR THE PRODUCTION OF CUSHIONS WITH BACK-FOAMED COVERS

BACKGROUND OF THE INVENTION

The invention relates to an apparatus for the production of cushions with back-foamed covers, especially car seat cushions, broadly consisting of a mold with a mix head arranged on it. A fixing device may be placed above the lower half of the mold, to which at least one pressing element (pressure pad, shaping machine ram) with a pressing edge for pressing the cover material section is arranged.

As a rule, a so-called vacuum mold tool is used in devices of this kind, where the cover material is drawn into the mold by means of a vacuum. If necessary, the sliding of the cover material is controlled by means of a tenter which presses the cover material onto the rim surrounding the mold cavity. In addition, a so-called counter-die may be used which presses the cover material into the cavity in order to fit it more closely to the contour (see, e.g. German Offenlegungsschrift No. 27 46 686).

Even with a combination of several or of all of these aids, difficulties arise in completely laying down the cover at critical points (such as, for example, fins and corners, upon the sides of the mold cavity). As the upper half of the mold presses on the projecting rim of the cover material during back-foaming, the resulting foam pressure can no longer tighten the cover material and cannot lay the cover material completely against the side of the cavity. Incompletely formed cushions are of no use. The use of rollers as pressing elements has already been attempted. This fails at all places where the side of the form hollow is contoured because rollers of rigid material are not flexible and rollers of softer material (such as rubber or foamed material) no longer manage to roll-off, because of strong flexing.

The object of the present invention is to improve the pressing edges of the pressing elements in devices of the kind mentioned to the extent that the faultless laying of the cover material against the side of the mold cavity is possible even at particularly critical places, such as fins and corners.

BRIEF DESCRIPTION OF THE DRAWINGS

FIG. 1 represents part of the device with a pressure pad in cross-section,

FIG. 2 represents part of the device according to FIG. 1 in side view,

FIG. 5 illustrates special method of bearing a balance spring.

DESCRIPTION OF THE INVENTION

Figure 3:
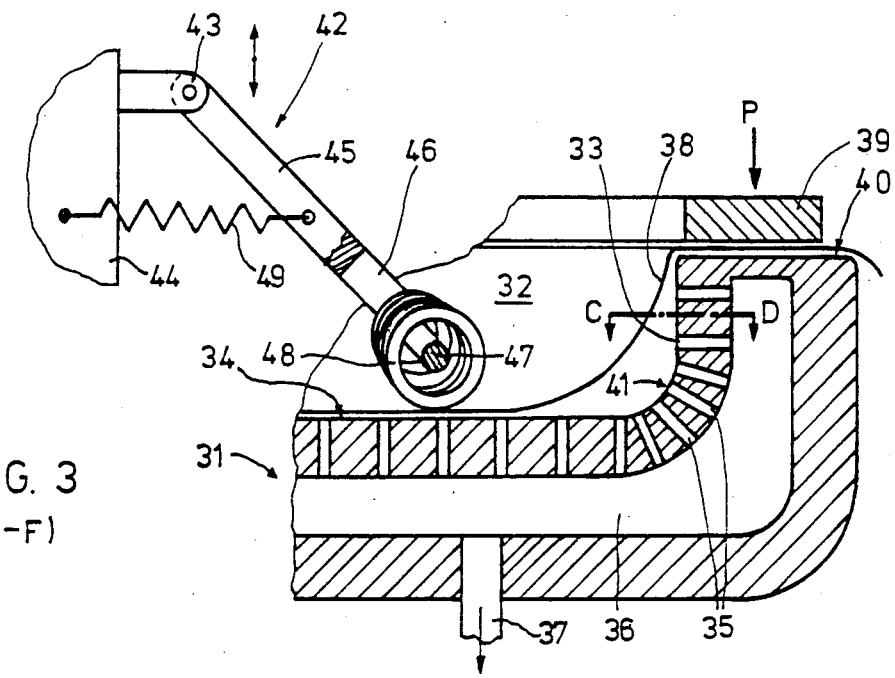
FIG. 3 represents part of the device with a corner ram in cross-section.

The above object is solved in that the pressing edge consists of at least one balance spring. More particularly, the present invention is directed to an apparatus for the production of back-foamed cushions from cover materials and foam comprising:

(i) a mold comprising an upper mold half and a lower mold half, said lower mold half defining a cavity, the inside surface of which is capable of being covered by said cover material, (ii) a mix head associated with said mold, said mix head capable of introducing foam materials and/or reactants into said mold cavity, and (iii) at least one pressing element for pressing said cover material into said mold cavity, said pressing element having a pressing edge which consists of at least one balance (helical) spring.

By this means, the simultaneous fitting of the pressing edge to the contour of the mold cavity can be achieved during tightening of the cover material. It is especially advantageous that the balance spring can rotate during the pushing movement. It is precisely this characteristic that allows the cover material to be pushed without creases and thus to be brought to critical points for laying down and, to be placed in ordered creases as may be necessary. The pressing element can be used as a hand apparatus. It can also be placeable in the sense of automatization by means of a fixing device above the lower half of the mold. The pressing element then fulfills its function during a movement of the fixing device and the mold towards each other. The coil of the spring both pushes the cover and simultaneously stretches the cover as it rolls. The pressure points necessarily change positions in the process. Depending on the contour of the mold, special embodiments may be more suitable than others.

According to a first embodiment the balance spring is inserted at its ends. In this embodiment the balance spring turns only around itself, so that it can only roll to a certain degree during the pushing movement and will subsequently glide. Given sufficient pressing pressure, the spring tension built up by the twisting after the pushing movement remains until the pressing element is lifted.

As an alternative to this, the balance spring can be stored so as to be rotatable. In this embodiment the balance spring simply rolls off and no longer exerts a pressure in the direction of pushing after stretching. Of course, if necessary, the balance spring is only inserted on one side.

The balance spring can be arranged on a core in the shape of a bow especially for fitting corners of the cavity. The bow preferably corresponds in shape to the relevant contour of the corner.

Preferably a balance spring with a varying diameter over its length is used in the case of such contourings of the mold cavity. As a result of this, the end of the balance spring, for example, can have an internal diameter corresponding to the external diameter of any core or bow that may be present. For most uses, in particular for corners, the diameter of the balance spring increases towards the middle.

It is possible to completely fill out the inner space surrounded by the balance spring with a core (e.g. a bow-shaped frame) or to leave air in between. Depending on where the pressing element is to be arranged, one or the other variant may be more advantageous.

For example, with frames on the base of the mold cavity, a pressure pad will be used as pressing element. Here, because of the essentially flat surface along the frame it is preferable that the balance spring not bend over its length. Thus, a core almost completely filling the inner space of the balance spring will be used. The case of pressing elements in the form of shaping machine rams is different. They serve for pressing the cover material into corners. There it is advantageous if the balance spring can adjust itself through pliability. For this application either no core is used or one (e.g. a bow-shaped frame) of small diameter is used. If necessary, the bow can also be of varying diameter over its length in order to achieve special support effect. Finally, it is also possible to choose material of suitable elasticity for the core or bow-shaped form.

According to a special embodiment several balance springs are placed next to each other along the same axis. This embodiment is especially suitable for pressing elements with long pressing edges. The separation into several distinct balance springs placed next to one another can prove advantageous. Depending on the application, it can be advantageous for the neighboring balance springs to be wound in the same or in opposite directions.

The balance springs are preferably of varying stiffnesses. By taking this measure, stronger or weaker pressures can be achieved at different points. Of course, in the arrangement of several balance springs these may, if necessary, be of different diameters.

Referring to the drawings, in FIGS. 1 and 2 the side (base) 1 of the cavity 2 of a lower half of the mold 2, 3 has a ridge 4. Aspirating holes 5 are provided in the side 1. By means of the low pressure operating there, a cover material section 6 is to be brought to fit closely to the side 1. The suction strength for a completely close fit is insufficient because of the small radii of the transition curvatures 7 between ridge 4 and side 1. For this reason a pressing element formed as a pressure pad 8 is used, whose pressing edges consist of balance springs 9, 10. The cover material 6 is pressed into the transition curvatures 7 and hence forth held firm by the suction strength during the movement against each other of mold 3 and pressure pad 8. The balance springs 9, 10 are wound with opposite orientations and their inner space is filled out by a core 11 serving as an axis, against which they lie. After pressing down the cover material 6, the pressure pad 8 may be removed again.

Figure 4:
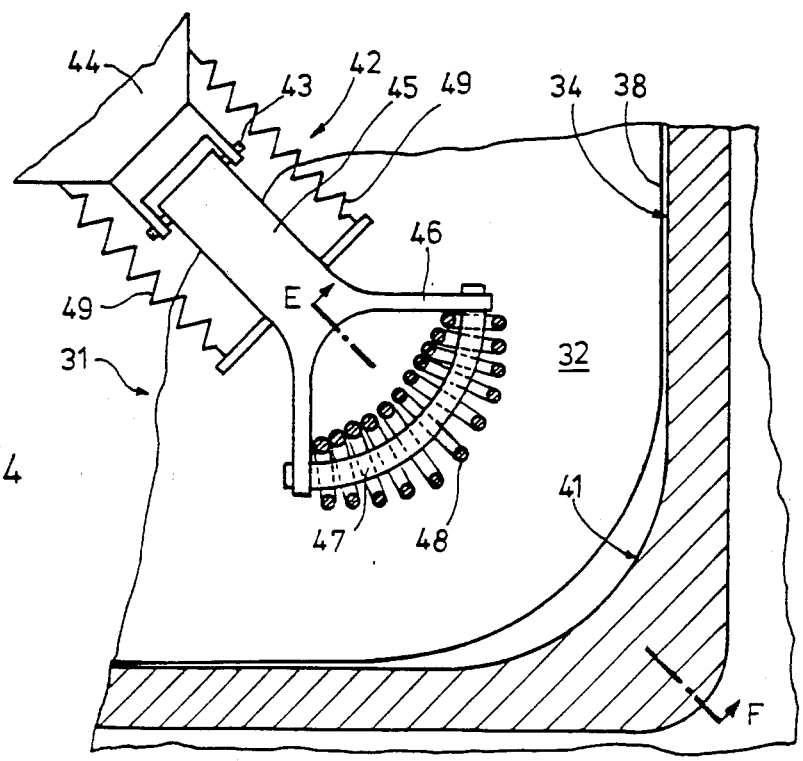
FIG. 4 represents part of the device according to FIG. 2 from a top view.

In FIGS. 3, 4, the lower mold half 31 of a mold is represented, whose cavity 32 is bounded by a side 34 with aspirating holes 33. These aspirating holes 33 are connected through channels 35 to a vacuum box 36, which is connected through a duct to a vacuum reservoir (not represented). A cover material 38 is loosely placed in the cavity 32, which is pressed with such force by a tenter 39 against the rim 40 surrounding the cavity 32 that it can still slide down into the cavity.

The suction force in the corners 41 of the cavity 32 is not sufficient to bring the cover material section 38 to a close fit against the side 34. For that reason, each corner 41 is provided with a pressing element in the form of a shaping machine ram 42. Only one shaping machine ram 42 is represented. Therefore, in what follows, the construction and method of operation of only one of the four similar shaping machine rams 42 required is described. This shaping machine ram 42 is stored at an easily handled holding device 44 indicated by means of a swivelling axis 43. It consists of a fork-like arm 45, in whose fork 46 an elastic bow-shaped frame 47 is arranged, which roughly fits the bend of the corner 41. This bow-shaped frame 47 serves as the core of a balance spring 48. The diameters of the exterior and the interior of the balance spring 48 are smallest at the end. The interior diameter is considerably larger than the diameter of the bow-shaped frame 47. The balance spring 48 is so held that it may be rotated, but is lightly pressed together by the fork 46. Upon a downward movement of the mounting 44 the shaping machine ram 42 comes into contact with the side (base) 34 and slews in the direction of the corner 41 as a result of the pressure. The arm 45 is made fast at the mounting 44 by means of a draw spring 49 and thereby exerts pressure on the side 34 or the cover material 38. As the balance spring 48 is relatively soft and has sufficient play around the bow-shaped frame 47, it can adapt very well to the contour of the side 34 during the movement and thereby tense the cover material section 38, pushing it into the corner 41. The balance spring 48 also encourages the formation of even creases desired in non-stretchable cover materials in the corner 41 in the vertical region of the side 34.

In FIG. 5, a balance spring is fitted with its end 52 in a hole 53 of the fork 54 of a shaping machine ram not represented.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the production of back-foamed cushions from cover materials and foam comprising:
    (i) a mold comprising an upper mold half and a lower mold half, said lower mold half defining a cavity, the inside surface of which is capable of being covered by said cover material,
    (ii) a mix head associated with said mold, said mix head capable of introducing foam materials and/or reactants into said mold cavity, and
    (iii) at least one pressing element for pressing said cover material into said mold cavity, said pressing element having a pressing edge which consists of at least one balanced spring.

2. The apparatus of claim 1, characterized in that the balance spring is secured at its end.

3. The apparatus of claim 1, characterized in that the balance spring is pivotally attached.

4. The apparatus of claim 1, characterized in that the balance spring is arranged on a core in the form of a bow-shaped frame.

5. The apparatus of claim 1, characterized in that the balance spring has a varying exterior diameter over its length.

6. The apparatus of claim 1, characterized in that several balance springs are arranged one after the other along the same axis.

7. The apparatus of claim 6, characterized in that the balance springs are of varying stiffnesses.

* * * * *